Sept. 29, 1964  E. A. LATHROP  3,151,064
WATER CONDITIONING METHOD AND APPARATUS
Filed May 8, 1961  2 Sheets-Sheet 1

INVENTOR.
ETHAN A. LATHROP
BY
Mead, Browne, Schuyler & Beveridge

INVENTOR.
ETHAN A. LATHROP

United States Patent Office 3,151,064
Patented Sept. 29, 1964

3,151,064
WATER CONDITIONING METHOD AND
APPARATUS
Ethan A. Lathrop, Box 206, Bradenton, Fla.
Filed May 8, 1961, Ser. No. 108,509
7 Claims. (Cl. 210—63)

This invention relates to methods and apparatus for conditioning water, and more particularly to methods and apparatus for purifying and improving the palatability of water.

The invention is particularly directed to the problems presented in many areas in the United States where available water contains undesirably high amounts of impurities such as hydrogen sulfides and other gases, inorganic minerals such as calcium or magnesium salts and bacteria, fungus, microorganisms, pathogenic disease germs, etc. These problems are particularly acute in areas not served by municipal water supplies since apparatus for treating the water is often not economically practical for an individual home owner. Frequently, the impurities which may be present in the water are present in such amounts or have an effect on water such that the water technically complies with health standards but is objectionable by possessing an unpleasant odor or taste, may have a slight degree of acidity or alkalinity, or may be "hard" when undesirable amounts of calcium or magnesium are present. Frequently, water may possess one or more of the last mentioned undesirable properties to an extent which is sufficient to be noticeable, yet not sufficient to justify the purchase of treatment apparatus to neutralize the undesirable effects.

One frequently encountered effect of the foregoing type results when an undesirable amount of hydrogen sulfide is present in the water supply. This imparts an extremely unpleasant odor and taste to the water.

Many of the foregoing effects can be neutralized to some extent by the use of chemical additives of various types. However, in most cases it is extremely inconvenient for the householder to use the additives continuously and to mix them with the water in the correct proportions.

It is a primary object of the present invention to provide a method for conditioning water to neutralize or nullify undesirable effects of the type described above in an efficient and economical manner.

It is an ancillary object of the invention to provide apparatus for carrying out the method of the foregoing object which may be economically employed on a household or commercial scale.

Still another object of the invention is to provide a self contained water supply system for conditioning water to neutralize or nullify effects of the types described above.

It is another object of the invention to provide a method and apparatus for efficiently conditioning water to nullify the unpleasant effects imparted to the water by the presence of sulphides therein.

Still another object of the invention is to provide methods and apparatus for intimately commingling water with an oxygen containing gas such as air to thoroughly expose impurities contained in the water to oxidation and improve the characteristics of the water.

The foregoing objects, and others, are, in their most basic sense, achieved by separating the water to be treated into extremely small particles, as by atomizing the water and, while the water is in this state, intimately exposing the individual particles to the action of an oxygen containing gas, such as air. In accordance with the present invention, water to be treated is discharged under pressure into a closed chamber in a plurality of relatively small high velocity streams of finely atomized droplets. Each stream of atomized droplets is so directed that it is intercepted by a high velocity stream of an oxygen containing gas, such as air, which disperses the stream and exposes each particle to a saturated oxygen supply. The method is conveniently performed by apparatus which includes aligned nozzles having a plurality of relatively small outlet passages oriented relative to each other so that gas issuing from one passage in one of the nozzles intercepts a stream of water discharged from a corresponding passage in the other nozzle.

Preferably, the water discharge nozzle is provided with two sets of passages, one passage of each set being oriented with respect to a corresponding passage of the other set in a manner such that the two streams of water droplets discharge from the two passages intercept each other just prior the point of interception of the water stream with a gas jet. The intercepting water streams further break up the individual water droplets, assist the gas stream in dispersing the spray, and create a desirable degree of turbulence to perform a thorough mixing action with the water droplets and air.

The water and air supplies are controlled in a manner such that they are simultaneously actuated or deactuated. Actuation of the air and water supplies is made responsive to the level of liquid within the chamber into which the air and water are discharged. In order to maintain a desired air space within the chamber to enable the intimate co-mingling of the air and water, the control system is adjusted such that the maximum level of water within the chamber is established at a location below that which air and water are discharged into the chamber, and water is replenished as necessary to maintain the desired water-air balance in the chamber.

Other objects and features of the invention will become apparent by reference to the following specification and to the drawings.

Figure 1:
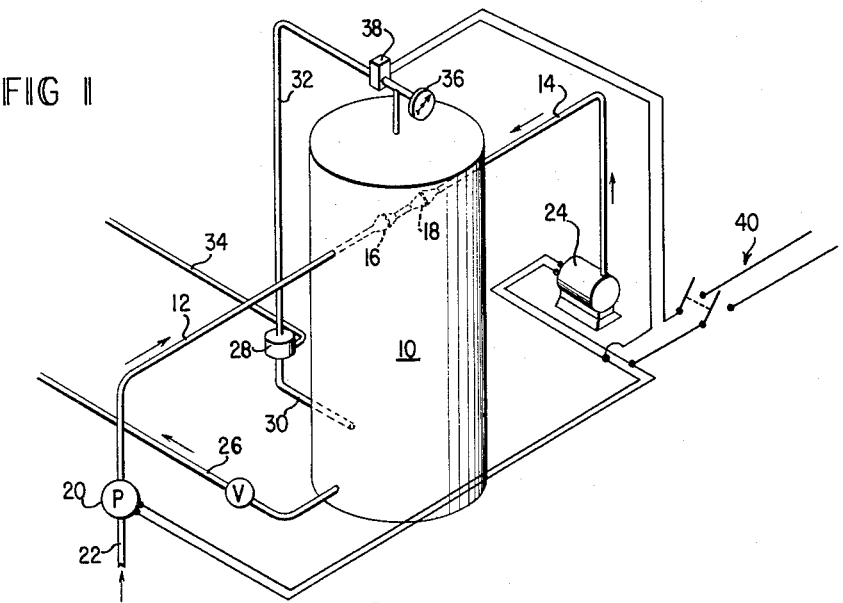
FIG. 1 is a diagrammatic view of a water conditioning apparatus embodying the present invention.

One form of apparatus for conditioning water in accordance with the present invention is shown in FIG. 1 as including a closed tank 10 to which inlet conduits 12 and 14 are connected. Conduits 12 and 14 are respectively connected to nozzle assemblies 16 and 18 located in the upper portion of the interior of tank 10. A motor driven pump 20 is connected to conduit 12 and is operable when actuated to pump water from a source partially indicated at 22 to supply water to be conditioned at a selected pressure to nozzle 16. Inlet conduit 14 is connected to an air compressor 24 which is operable, when actuated, to supply air under pressure to nozzle 18. The structural details of pump 20 and air compressor 24 form no part of the present invention and may take the form of any commercially available units of suitable capacity. Pump 20 and air compressor 24 are actuated and deactuated simultaneously and, for convenience, it is preferable that pump 20 and compressor 24 take the form of electrically driven units, as indicated in the drawings, so that both may be started and stopped by a single control switch.

An outlet pipe 26 is connected to the lower portion of tank 10 to conduct water from the interior of tank 10 to the point of use.

Figure 2:
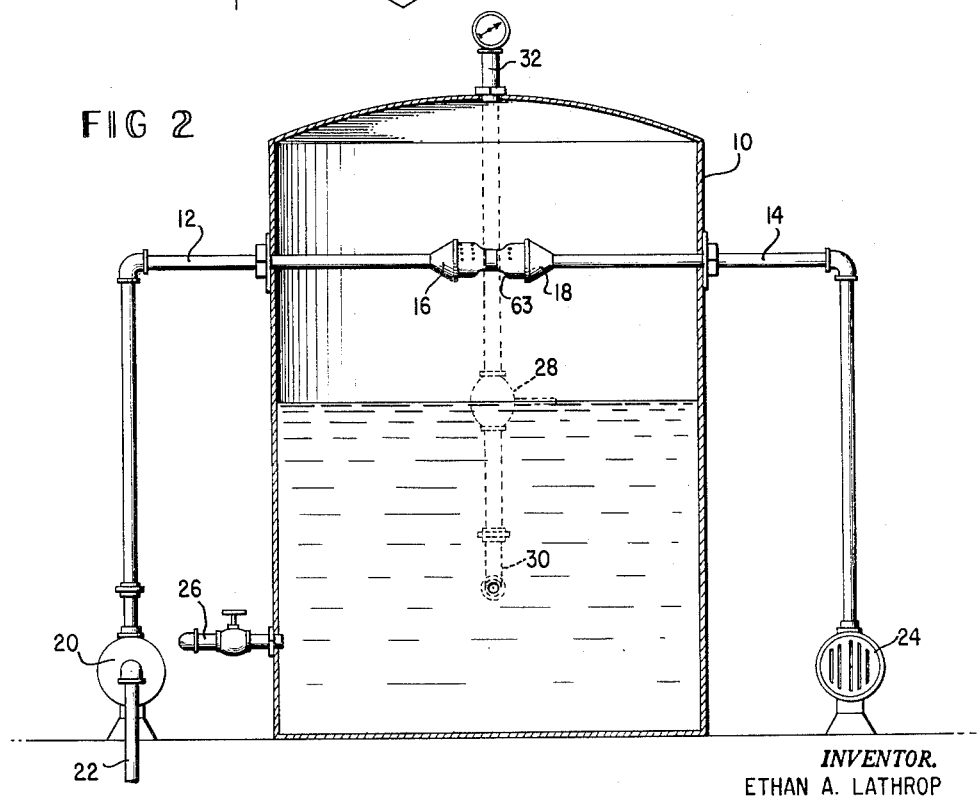
FIG. 2 is a vertical cross-sectional view taken through the tank of the apparatus of FIG. 1.

In addition to the foregoing connections, a float controlled venting valve 28 is connected to the interior of tank 10 by a conduit 30 which opens into the lower portion of the tank. As best seen in FIG. 2, float controlled valve 28 is mounted at the exterior of the tank at the location of the desired maximum water level in the tank. A conduit 32 is connected between the head space or upper portion of the interior of tank 10 and valve 28. Operation of valve 28, by structure to be described in greater detail below, controls communication between conduit 32 and a venting conduit 34 which is open to atmospheric pressure. Conduit 32 is preferably provided with an indicating gauge 36 to indicate the gas pressure in the head space of tank 10 and is also connected to a pressure switch 38 of conventional construction which is connected in the electrical supply circuit to pump 20 and air compressor 24 in the fashion shown in FIG. 1 to selectively connect or disconnect pump 20 and compressor 24 to a source of electric power schematically illustrated at 40. Pressure switch 38 may take any one of several commercially available forms and is arranged to close or complete the electrical circuit when the pressure in conduit 32 drops below a selected value and to open or break the electric circuit when the pressure within conduit 32 rises above a selected pressure.

Figure 3:
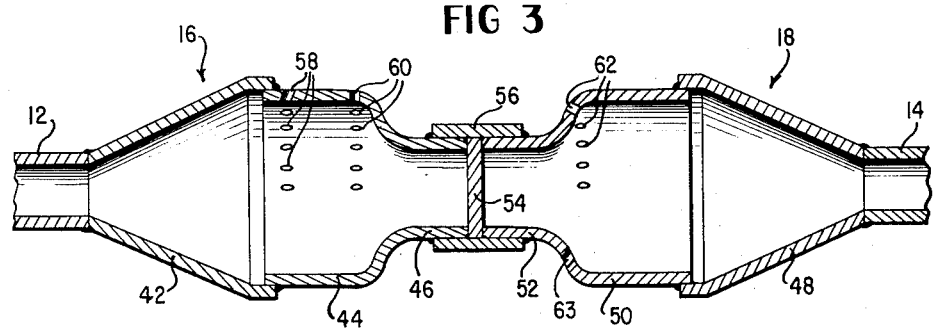
FIG. 3 is a vertical cross-sectional view taken centrally through the nozzle assembly employed in the apparatus of FIG. 1.
Figure 4:
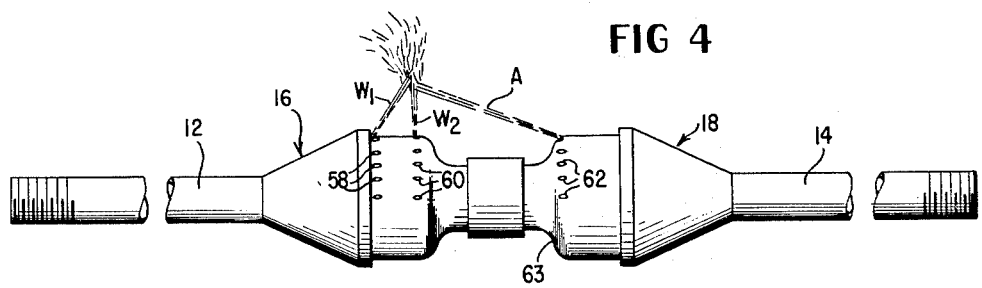
FIG. 4 is a side elevational view of the nozzle assembly of FIG. 3.

The structural details of nozzles 16 and 18 are best seen in FIGS. 3 and 4. Nozzle 16 includes a frusto-conical section 42 fixedly secured at its small diameter end to the inner end of inlet conduit 12 as by a weldment. A chamber defining end member 44 is fixedly mounted in the large diameter end of member 42 and is formed with a reduced diameter section 46 at its opposite end.

Nozzle member 18 includes a frusto-conical member 48, identical to member 42 of nozzle 16 and welded at its small diameter end to the inner end of inlet conduit 14. A chamber defining end member 50 of a shape similar to the shape of member 44 is similarly welded into the large diameter end of member 48. Communication between the chambers respectively defined by members 44 and 50 is blocked by a plate 54 seated between the opposed ends of members 44 and 50. Members 44 and 50 are rigidly maintained in alignment with each other by a cylindrical coupling member 56 received upon the respective small diameter sections 46 and 52 and welded to members 44 and 50 to maintain the members in alignment with each other.

Nozzles 16 and 18 differ from each other solely in the arrangement of outlet passages formed in the nozzle. Members 44 and 50 are constructed with a wall thickness such that the nozzle passages 58, 60, and 62 are of sufficient length to guide the streams of water or gas issuing from the passages into directed streams. As best seen in FIG. 3, nozzle 16 is formed with two series of passages 58 and 60 which pass through the wall of member 44 in radially inclined relationship to the axis of member 44. Passages 58 and 60 are located in paired axial alignment with each other at symmetrically spaced positions extending around the upper half of the circumference of member 44. The inclination of the passages relative to each other is such that a jet of water such as W-1 issuing from one of passages 58 intercepts a jet of water W-2 issuing from the aligned passage 60. Passages 62 in member 50 are inclined and aligned with corresponding passages 58 and 60 in member 44 in a manner such that a jet of air A (FIG. 4) issuing from a passage 62 intercepts water jet W-2 issuing from the corresponding passages 58 and 60 between nozzle 16 and the point where the two water jets intercept each other.

Water discharged from passages 58 and 60 of nozzle 16 is successively subjected to several conditions tending to break up water particles or droplets into a finely atomized spray. First, the turbulence within the chamber defined by nozzle 16 and the relatively high pressure with which the water is discharged through passages 58 and 60 tends to break the water up into fine droplets. The intercepting jets from the various pairs of passages 58 and 60 together with the interception of the jets by the air jets from nozzle 18 further tends to break up the individual droplets into even finer droplets. In addition, the velocity at which the droplets are discharged from passages 58 and 60 is such that even after the interception of the water and air jets with each other, the water droplets are still traveling with a high enough velocity to strike the top and upper side surfaces of tank 10 with sufficient force to even further break up the individual particles.

The interception of the water jets by the corresponding air jets from nozzle 18 creates a turbulent spray or mist of fine water droplets, thus achieving a maximum exposure of droplet surface area to the action of the air under pressure expelled under passages 62. To further increase the exposure time of the atomized droplets, a downwardly directed slot 63 is cut in the lower portion of member 50 to discharge a fan-like air stream somewhat downwardly toward the surface of the body of water in tank 10 and toward the opposite side portion of the tank. This air stream is deflected by the surface of the body of water and by the tank wall to further create a turbulence in the interior of the tank above the water level and below nozzle 16 and 18 to further increase the time of exposure of the individual water droplets to the air as the droplets fall from the upper portion of the tank toward the body of water contained in the lower portion of the tank.

Figure 5:
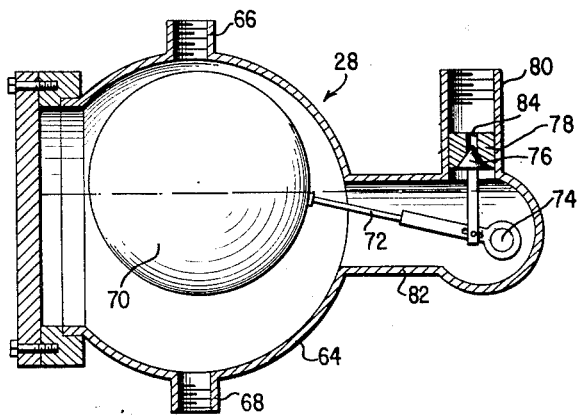
FIG. 5 is a vertical cross-sectional view showing details of a float controlled venting valve employed in the system of FIG. 1 showing the valve in its closed position.
Figure 6:
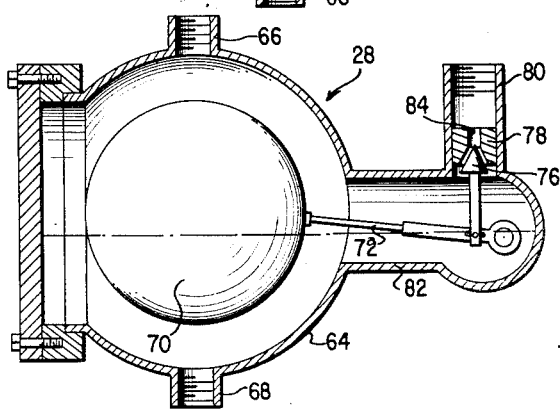
FIG. 6 is a cross-sectional view similar to FIG. 5, showing the valve in its open position.

Details of the float controlled vent valve 28 are best seen in FIGS. 5 and 6. Valve 28 includes a main hollow housing 64 formed with fittings 66 and 68 by means of which the interior of housing 64 is respectively connected to conduits 32 and 30. As stated above, valve 28 is mounted at the exterior of tank 10 at a location corresponding to the desired normal level of water in tank 10 so that when tank 10 is filled with the desired amount of water, the water level within housing 64 is approximately at the level indicated in FIG. 5. A float 70 is located within housing 64 and is raised or lowered within the housing in accordance with the variations of water level within the housing as indicated by a comparison of FIGS. 5 and 6. An arm 72 rigidly attached at one end to float 70 is connected at its opposite end for pivotal movement about a shaft 74 in accordance with raising and lowering movement of float 70. A valve head 76 is mounted upon arm 72 for movement with the arm toward and away from a valve seat 78 mounted in a fitting 80 on projection 82 of housing 64. In use, fitting 80 is connected to vent pipe 34, and thus that portion of fitting 80 above valve seat 78 is in constant communication with the atmosphere.

Valve 28 functions to control actuation of pump 20 and air compressor 24 in response to the level of water contained within tank 10. Normally, water within tank 10 is at the normal level indicated in FIG. 5, thus urging float 70 upwardly and driving valve head 76 against seat 78 to close passage 84. When valve head 76 is seated upon valve seat 78, it seals the interior of housing 64 from the atmosphere, and thus permits pressure to build up in conduit 32 and the head space in tank 10 above the water contained in the tank. Since pressure switch 38 is connected to be responsive to the pressure existing within conduit 32, the pressure in conduit 32 maintains pressure switch 38 in its open position as long as the water level in tank 10 remains at its normal level.

When the level of water within tank 10 drops, the level of water contained within housing 64 drops correspondingly. When the water level within housing 64 drops to a selected level, as for example that level indicated in FIG. 6, float 70 moves downwardly, swinging arm 72 downwardly about pivot shaft 74 to lower valve head 76 out of engagement with valve seat 78. This movement of valve head 76 places the interior of housing 64, and hence conduit 32, in communication with the atmosphere through passage 84 and fitting 80. Venting of the head space in tank 10 and conduit 32 lowers the pressure in conduit 32 to a point where pressure switch 38 closes to simultaneously energize pump 20 and air compressor 24 to respectively supply water and air under pressure to nozzles 16 and 18 in a manner described in more detail below.

Water and air are supplied to tank 10 until the level of water within tank 10 rises to a level sufficient to move valve head 76 back into engagement with its seat 78. This action blocks the atmospheric vent to the head space in tank 10, but both pump 20 and compressor 24 continue to operate until the gaseous pressure within the head space of tank 10 builds up to a pressure sufficient to open the contacts of pressure switch 38. When switch 38 is open, pump 20 and compressor 24 are simultaneously de-energized by the opening of switch 38.

When pump 20 is operating to supply water under pressure to nozzle 16, the internal shape of the chamber defined by members 42 and 44 is such that water within the chamber is in continual movement in an extremely turbulent condition. The turbulence within the chamber, combined with the relatively small diameter of outlet passages 58 and 60 causes the water to issue from passages 58 and 60 in directed streams which consist of a spray of finely divided or atomized water droplets. Since the basic purpose of operation of the apparatus described is to thoroughly expose the water to the action of oxygen, the smaller the particles or droplets of water, the better the result achieved. To further assist in breaking up the water droplets to droplets of minimum size, the streams of water which issue from passages 58 and 60 are so directed as to intercept each other, and this action combined with the directing of a high velocity stream of oxygen containing gas or air from nozzle 18 further breaks up the streams of droplets into extremely fine droplets which are dispersed into a fine mist which is maintained in turbulence by the action of the air jet from nozzle 18. By disposing all of passages 58, 60 and 62 in the upper half of their respective nozzles, the major portion of the fine mist of water particles is directed upwardly within the tank, thus increasing the distance the water particles must travel through the air in tank 10 before reaching the body of water in the lower portion of the tank.

In addition, as explained above, the individual droplets are further broken up by their impingement at relatively high velocity against the inner walls of the tank. The turbulence created in the upper portions of the tank by the intercepting air and water jets tends to delay the individual droplets in their falling by gravity toward the body of water within the tank, and the turbulence created at the level below that of nozzles 16 and 18 by the downwardly directed air stream discharged from slot 63 creates a further zone of turbulence through which the droplets must pass before reaching the body of water. The turbulence increases the period of time in which the individual droplets are exposed to the air, thereby achieving a more complete aeration of the individual particles.

In order to assure that the action described above always occurs under uniform conditions, vent valve assembly 28 and pressure switch 38 coordinate with each other to maintain a water-air balance within the tank. Referring now to FIG. 2, it will be assumed that both pump 20 and compressor 24 are inactive and that the water within the tank is located at its normal level which, for the sake of a specific example will be assumed to represent a quantity of 48 gallons of water within the tank. The pressure in the head space within the tank above the surface of the water will be assumed to be 40 pounds per square inch.

With these conditions, it will now be assumed that water is withdrawn from the tank at a steady rate through outlet pipe 26. As the water is withdrawn, the level of water within the tank begins to drop, thus increasing the head space above the water within tank 10 to thereby cause the pressure in the head space to also drop. The float of vent valve assembly 28 is so located and adjusted that the float holds valve head 76 in seated engagement with valve seat 78 until approximately 12 gallons of water have been withdrawn from the tank. At this time, the pressure in the head space has dropped from its original 40 pounds per square inch to approximately 28 pounds per square inch. As withdrawal of water from the tank is continued beyond the initial 12 gallons, valve head 76 is withdrawn from seat 78 to place the head space within tank 10 in communication with the atmosphere, thus venting the pressure in the head space to atmosphere.

When the pressure within the head space of tank 10 drops to 20 pounds per square inch, pressure switch 38 simultaneously actuates both pump 20 and compressor 24 to supply water and air to the interor of the tank in the manner described above. The capacity of pump 20 is selected to be such that water is conducted into tank 10 at a rate greater than water can be withdrawn from the tank through conduit 26. Thus, even though the withdrawal of water through conduit 26 is continued actuation of pump 20 and compressor 24 feeds water into the tank at a rate greater than that at which it is withdrawn and the level of water within tank 10 begins to rise. Vent valve 28 remains open until the amount of water within the tank has been restored to 36 gallons, at which time float 70 drives valve head 76 into seated engagement with valve 78, thus closing the vent to the head space in tank 10. The level of water within the tank and the pressure in the head space of the tank is then built up until the water level corresponds to a volume of 48 gallons within the tank, at which time the pressure switch indicates 40 pounds per square inch head pressure and simultaneously discontinues operation of the pump and air pressure.

The foregoing action achieves two very important features. First, the supply of water and air to the interior of the tank is balanced so that pressure in the head space can accurately regulate the level of water within the tank. This is accomplished by commencing the introduction of air under pressure into the interior of the tank with the interior of the tank at atmospheric pressure when the water is at a selected level—i.e., 36 gallons—at which time valve head 76 is seated on seat 78 to permit the pressure to build up. Vent valve 28 is further constructed in a fashion such that the level of water within tank 10 will, in a situation of continuous withdrawal, be lowered by an amount corresponding to approximately 4 gallons between the time valve head 76 is first released from seat 78 and the pressure in the head space has dropped to 20 p.s.i. at which time the pump and motor are started.

In addition to directly relating head pressure to liquid level, the foregoing action achieves a second basic function in permitting the removal from the head space of the gases formed by the aeration process and the impurities present in the gas either in suspension or in chemically combined form. Further, the venting of the head space pressure assures that air and other gases entrained within the main body of water within tank 10 can be readily released from the water by virtue of the reduction in the pressure above the surface of the water.

The foregoing action subjects the water to be treated to a thorough aeration as it enters tank 10. This action in turn oxidizes the impurities which may be contained in the water and has been found especially effective in overcoming the unpleasant characteristics found in water where hydrogen sulphide may be present in objectionable amounts. It should be noted that the action does not reduce the total sulphur content of the water, but instead transforms the hydrogen sulphide into other sulphur compounds which do not present the objectionable odor of hydrogen suphide. In addition, the foregoing action tends to neutralize water which may have either alkaline or acid characteristics and also acts to soften water and to oxidize minerals which may be present in the water and to further supply oxygen in amounts sufficient to permit aerobic digestion of bacteria or of other microorganisms present.

While I have described an exemplary embodiment of my invention, it will be apparent to those skilled in the art that the disclosed embodiment may be modified. Therefore, the foregoing description is to be considered exemplary rather than limiting and the true scope of the invention is that defined in the following claims.

I claim:

1. The method of purifying water comprising the steps of discharging water under pressure into the interior of a closed chamber in a plurality of relatively small upwardly directed streams of finely atomized droplets until the level of water within said chamber reaches a predetermined level at a location below the point from which water is discharged into said chamber, simultaneously discharging oxygen containing gas under pressure into said chamber in first high velocity streams gas respectively directed to intercept and disperse said streams of atomized droplets, and a second stream of oxygen containing gas downwardly toward the lower portion of said chamber to create a zone of turbulence above the surface of water within said chamber, terminating the discharge of oxygen containing gas into said chamber simultaneously with the termination of the discharge of water into said chamber, and subsequently simultaneously discharging water and oxygen containing gas under pressure into said chamber in the foregoing manner to maintain the level of water within said chamber at said predetermined level and to maintain the pressure of gas within said chamber above the water at a predetermined pressure.

2. Water conditioning apparatus comprising a closed tank, a spray nozzle having a plurality of relatively small outlet passages therein, water supply means connected to said spray nozzle and operable when actuated to discharge water into the upper portion of said tank through said passages in high velocity streams of finely atomized droplets, a fixed gas discharge nozzle mounted in the upper portion of said tank adjacent said spray nozzle, said gas discharge nozzle having a plurality of passages therein oriented to discharge gas from said nozzle in streams respectively directed to intercept the streams of droplets discharged from the passages in said spray nozzle, oxygen containing gas supply means connected to said gas discharge nozzle and operable when actuated to discharge oxygen containing gas under pressure from the passages in said gas discharge nozzle, and control means for simultaneously actuating said water supply means and said gas supply means when the level of water within said tank falls below a pretedmined level and for simultaneously de-actuating said water supply means and said gas supply means when the level of water in said tank rises to a selected level located below said spray nozzle and said gas discharge nozzle.

3. Water conditioning apparatus as defined in claim 2 wherein said passages in said spray nozzle are arranged in a first series of passages and a second series of passages, each passage in said first series being aligned with a passage of said second series to discharge atomized droplets in a stream which intercepts a steam of atomized droplets discharged from the aligned passage of said second series, the passages of said gas discharge nozzle being each respectively aligned with one of said first series of passages to direct the stream of gas discharged therefrom to intercept the stream of droplets discharged from the aligned passage of said first series between said spray nozzle and the point at which the last mentioned stream of droplets intercepts the stream of droplets discharged from the aligned passage of said second series.

4. Water conditioning apparatus as defined in claim 2 wherein said control means comprises means responsive to the gas pressure in the upper portion of said tank for simultaneously actuating said water supply means and said gas supply means when said pressure drops below a predetermined pressure, a venting valve for venting the upper portion of said tank to atmospheric pressure, and a float member for opening said venting valve when the level of water within said tank falls below a predetermined level and for closing said venting valve when the level of water within said tank rises above said predetermined level.

5. Water conditioning apparatus comprising a closed tank, a water inlet conduit and a gas inlet conduit extending into the upper portion of said tank and terminating in said tank at respective first and second fixed discharge nozzles located in adjacent facing relationship in the upper portion of said tank, said first and said second nozzle each having a series of relatively small outlet passages therein located relative to each other so that a stream of water discharged from a passage in said first nozzle will intercept a stream of gas discharge from a corresponding passage in said second nozzle, pump means connected to said water inlet conduit and operable when actuated to discharge water from the passages in said first nozzle at a pressure sufficient to produce high velocity streams of finely atomized water droplets, air compressor means connected to said gas inlet conduit and operable when actuated to discharge air from the passages in said second nozzle at a pressure sufficient to cause the streams of air discharged from the passages in said second nozzle to intercept and disperse the respective streams of water discharge from said passages in said first nozzle, and control means responsive to the level of water within said tank for simultaneously actuating or de-actuating said pump means and said air compressor means to maintain the level of water within said tank above a predetermined minimum level and below a predetermined maximum level located below said nozzles.

6. Water conditioning apparatus as defined in claim 5 wherein said passages in said first nozzle are disposed in a first and a second series, each passage of said first series being aligned with a passage of said second series to discharge a stream of water droplets which intercepts the stream of water droplets discharged from the aligned passage of said second series beyond the point at which a stream of air from said second nozzle intercepts the last mentioned stream of water droplets from said passage of said first series.

7. Water conditioning apparatus as defined in claim 5 including means on said second nozzle defining a slot therein for discharging a downwardly directed stream of air to create a zone of turbulence between said nozzles and the body of water within said tank.

References Cited in the file of this patent

UNITED STATES PATENTS

| | | |
|---|---|---|
| 226,814 | White | Apr. 20, 1880 |
| 671,176 | Bangs | Apr. 2, 1901 |
| 835,886 | Gunn | Nov. 13, 1906 |
| 1,731,409 | Fitts | Oct. 15, 1929 |
| 1,985,010 | Berkhuijsen | Dec. 18, 1934 |
| 2,872,415 | Schleyer et al. | Feb. 3, 1959 |